May 10, 1927.
A. A. POLLOCK
1,628,425
CONTROL OF DYNAMO ELECTRIC MACHINES
Filed Sept. 28, 1926
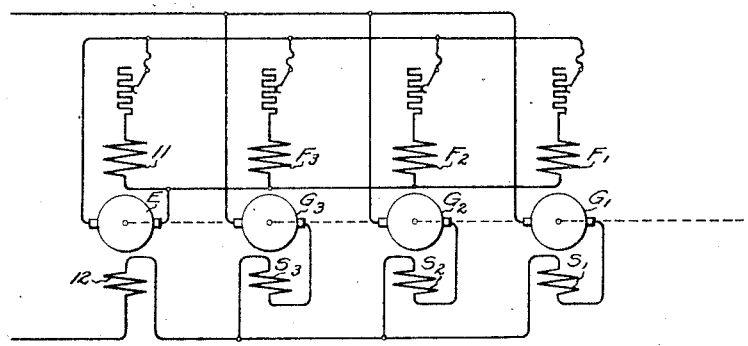
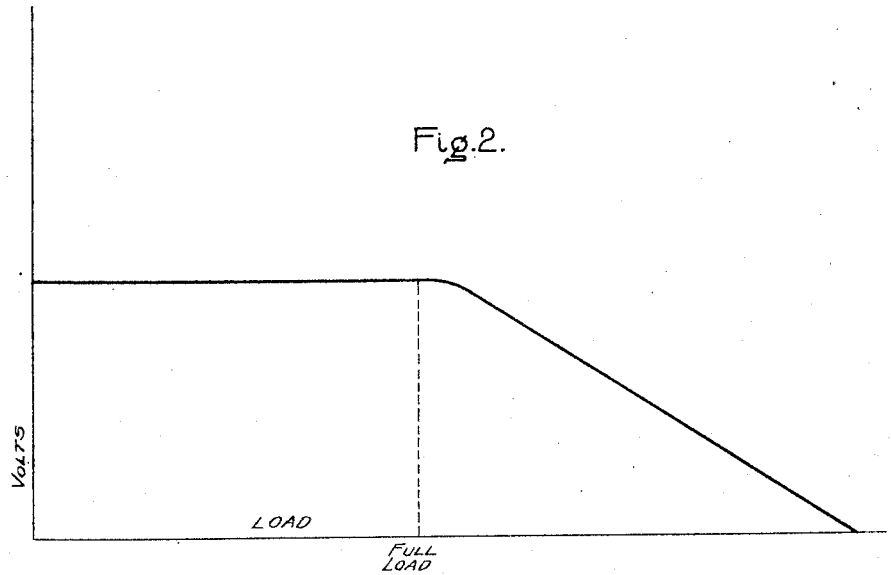
Inventor:
Alan Adair Pollock,
by
His Attorney.

Patented May 10, 1927.

1,628,425

UNITED STATES PATENT OFFICE.

ALAN A. POLLOCK, OF LEAMINGTON SPA, ENGLAND, ASSIGNOR TO GENERAL ELECTRIC COMPANY, A CORPORATION OF NEW YORK.

CONTROL OF DYNAMO-ELECTRIC MACHINES.

Application filed September 28, 1926, Serial No. 138,291, and in Great Britain October 12, 1925.

In water wheel driven plants it is often desirable to make each unit of as large capacity as possible, and owing to the runaway speed on light loads of such prime movers being 80% to 100% above the normal full load speed, it is often impracticable to build a single large direct current generator to absorb the full capacity of the wheel, and it is therefore customary to connect two or more generators in tandem on the wheel shaft, the generators being connected to run in parallel.

Where an alternating current supply is available a number of motor generator sets may be installed, the direct current generators of which have to run in parallel, and if the motors are of the synchronous type the conditions as regards parallel running are similar to the case where a number of generators are mounted on the same shaft.

In order to secure satisfactory parallel running and equal division of load between the various direct current generators comprising such systems, it is necessary to make special provision as regards the method of control by means of an automatic regulator, or alternatively, to build generators with a substantially drooping characteristic, that is, the voltage falling away as the load increases.

In this latter method of securing satisfactory parallel running it is usual to decompound the generators but as such a drooping characteristic may not be suitable for the operation of the plant as a whole, it may be necessary to vary the excitation so as to alter this characteristic. A method which has been used in the past is to connect the machines by means of an equalizer busbar outside the decompounding winding and then fit the machines with a compounding winding connected between this equalizer connection and the negative busbar. This compounding winding counteracts the effect of the decompounding winding as far as the group of machines as a whole is concerned, but permits the individual generators to have a drooping characteristic as far as the load sharing is concerned.

On very heavy current machines, the use of an equalizer busbar connection is objectionable owing to the complication in switching and the making of suitable switches to deal with the currents under consideration is difficult.

The object of the present invention is to avoid such difficulties and produce a still more desirable load characteristic.

The various features of novelty which characterize my invention are pointed out with particularity in the claims annexed to and forming part of this specification. For a better understanding of my invention, reference may be had to the following description taken in connection with the accompanying drawing, in which Fig. 1 is a diagrammatic illustration of one embodiment of my invention, and Fig. 2 is a load characteristic of an equipment embodying my invention.

In Fig. 1 of the drawing, a group of three generators $G^1$, $G^2$, $G^3$, connected to operate in parallel, are shown as mechanically connected together and driven by a motor, such as a water wheel (not shown). Also mechanically connected to the motor is an exciter E. The exciter E is used for the excitation of each of the group of generators. Each of the generators has a separately excited field winding $F^1$, $F^2$, $F^3$ connected to the armature of the exciter E, and a differential series field winding $S^1$, $S^2$, $S^3$. The exciter has a shunt winding 11 and a cumulative compounding winding 12 energized by the full current of the group generators or a shunted portion thereof.

It will therefore be seen that each of the group of generators is provided with a differential series winding and a separately excited field winding supplied with excitation by the exciter E, which is over compounded by the field winding 12 taking the total current of the group of generators in such a manner that the voltage of the exciter is increased as the load increases by a percentage comparable with the percentage reduction in effective field ampere turns on the main generators due to the decompounding windings $S^1$, $S^2$, $S^3$. The result of this arrangement is that a substantially flat full load characteristic is obtained over the working range of the machine. If now we make the exciter field reach the saturation point at a voltage corresponding to the full load excitation of the main generators, then any further increase in load will not increase the exciter voltage, but on the other hand the current in the decompounding winding on the main generators will continue to increase and thereby reduce the effective excitation of the main generators on overload. This is a desirable feature in that it may be made to limit the current of the main generators on short circuit and thus afford protection to the machines in the event of accident.

Fig. 2 illustrates the type of load characteristic which will be obtained from such an equipment and shows the voltage to be practically constant up to full load and then rapidly falling off on overload. It will of course be understood that the voltage load characteristic for the working range of the machine, that is, from no load to full load, may be rising or drooping if desired, by suitable modification in the effective value of the compounding coil 12 on the exciter.

What I claim as new and desire to secure by Letters Patent of the United States, is:—

1. In combination, a group of direct current dynamo electric machines connected to operate in parallel, each of said machines having a separately excited field winding and a differential series field winding, and an exciter having an armature connected to said separately excited field windings on said machines, said exciter having a cumulative compounding winding energized in accordance with the total current of said group of machines.

2. In combination, a group of direct current generators connected to operate in parallel, each of said generators having a separately excited field winding and a differential series field winding, and an exciter having an armature connected to said separately excited field windings on said generators, said exciter having a cumulative compounding winding energized in accordance with the total current of said group of generators, the excitation of said separately excited windings of said generators by said exciter counteracting the excitation by said differential series field windings so far as the group of generators is concerned, but permitting each of said generators to have a drooping characteristic so far as load sharing is concerned.

3. In combination, a group of direct current generators connected to operate in parallel, each of said generators having a separately excited field winding and a differential series field winding, and an exciter having an armature connected to said separately excited field windings on said generators, said exciter having a cumulative compounding winding energized in accordance with the total current of said group of generators, the excitation of said separately excited windings of said generators by said exciter counteracting the excitation by said differential series field winding so far as the group of generators is concerned, but permitting each of said generators to have a drooping characteristic so far as load sharing is concerned, the field of said exciter being designed to reach the saturation point at a voltage corresponding to the full load excitation of said generators.

In witness whereof I have hereunto set my hand this third day of September, 1926.

ALAN A. POLLOCK.

CERTIFICATE OF CORRECTION.

Patent No. 1,628,425. Granted May 10, 1927, to

ALAN A. POLLOCK.

It is hereby certified that error appears in the printed specification of the above numbered patent requiring correction as follows: In the grant, title of invention, for the word "Controls" read "Control"; Page 2, line 62, claim 3, for the word "for" read "far"; and that the said Letters Patent should be read with these corrections therein that the same may conform to the record of the case in the Patent Office.

Signed and sealed this 7th day of June, A. D. 1927.

Seal.

M. J. Moore,
Acting Commissioner of Patents.